United States Patent Office 3,515,721
Patented June 2, 1970

3,515,721
3-TERTIARY-AMINOETHYL-4-METHYL OR PHENYL-7-ETHOXYCARBONYLMETHOXY - HALO OR MONONITRO COUMARINS AND CONGENERS
Heinrich Ritter, Dornigheim, Kreis Hanau, Rudi Beyerle, Bruchkobel, Kreis Hanau, and Rolf-Eberhard Nitz, Frankfurt am Main-Fechenheim, Germany, assignors to Cassella Farbwerke Mainkur Aktiengesellschaft, Frankfurt am Main-Fechenheim, Germany, a company of Germany
No Drawing. Filed June 26, 1967, Ser. No. 649,002
Int. Cl. C07d 87/36
U.S. Cl. 260—247.2    4 Claims

ABSTRACT OF THE DISCLOSURE

Known coronary vasodilators are subject to various disadvantages such that they are not usable in hypotonic patients and in those having an acute myocardial infection. The coronary vasodilators of the present invention specifically dilate the coronary vessels only and, thus, do not exhibit a hypotensive action and at the same time possess long term activity. Our new vasodilators having these desirable properties are derivatives of the 7-hydroxy-coumarin having the formula

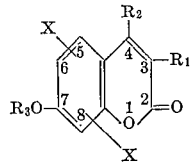

wherein the X is selected from the group consisting of chlorine, bromine, iodine and mononitro or one of the X is selected from the group consisting of chlorine, bromine, iodine and mononitro and the other X is a hydrogen atom, $R_1$ is selected from the group consisting of piperidino ethyl, morpholino ethyl, pyrrolidino ethyl, diethylamino ethyl and diethylamino propyl, $R_2$ is selected from the group consisting of methyl and phenyl, and $R_3$ is selected from the group consisting of ethoxy-carbonyl-methyl and ethoxy-carbonyl-ethyl.

FIELD OF THE INVENTION

The administration of coronary vasodilators is to bring about an enhanced blood flow in the coronary vessels. The conventional coronary vasodilators, however, involve the disadvantage of exercising merely a non-specific vasodilator action on the coronary vessels because they simultaneously cause a dilatation of other large blood vessel areas, which is symptomatic of a considerable decrease in blood pressure. This hypotension does not allow the use of the known coronary vasodilators in hypotonic patients and in those having an acute myocardial infection. In such cases, the known agents may even evoke a paradoxical effect on the coronary vessels, namely a coronary blood flow decreasing effect (see Scheler and Bretschneider, Verhandlungen der deutschen Gesellschaft fur Kreislaufforschung, vol, 26, page 254 (1960)). Moreover, the known coronary vasodilators have only a relatively short-term action.

SUMMARY AND OBJECTS

Consequently, the objective of our interest has been directed to the development of such coronary vasodilators as specifically dilate the coronary vessels only and, thus, do not exhibit a hypotensive action and which especially possess a long-term activity. Now, we have found that the desired properties inhere in the derivatives of the 7-hydroxy-coumarines of the general formula

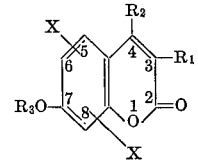

wherein X is selected from the group consisting of chlorine, bromine, iodine and mononitro or one of the X is selected from the group consisting of chlorine, bromine, iodine and mononitro, and the other X a hydrogen atom, $R_1$ is selected from the group consisting of piperidino ethyl, morpholino ethyl, pyrrolidino ethyl, diethylamino ethyl and diethylamino propyl, $R_2$ is selected from the group consisting of methyl and phenyl, and $R_3$ is selected from the group consisting of ethoxy-carbonyl-methyl and ethoxy-carbonyl-ethyl.

DESCRIPTION

The new 7-hydroxy-coumarin derivatives are obtained by reacting, in the known manner, and in the presence of an acid-binding agent, 7-hydroxy-coumarins having the general formula

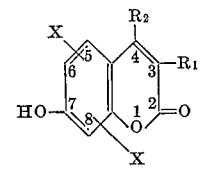

wherein $R_1$, $R_2$, and X have the meaning given above, with halogen compounds of the general formula $R_3Hal$, wherein Hal stands for a halogen atom selected from the group consisting of chlorine, bromine and iodine and $R_3$ has the meaning given above.

The 7-hydroxy-courmarins required as starting materials may be prepared, according to known methods, by halogenation and/or nitration of the appropriate 7-hydroxy-coumarins. The preparation of the starting materials does not fall under the scope of the present invention.

The examples given below will illustrate suitable methods of producing typical derivatives included in our invention. It will be understood, however, that specific steps in the described procedures can be varied as will be evident to one skilled in the art and that additional derivatives may be similarly prepared. Any such variations which do not depart from the basic concept covered by the appended claims are part of our invention.

Example 1

21 g. monobromo - 3 - β - diethylaminoethyl - 4 - methyl-7-hydroxy-coumarin hydrobromide, prepared as described below, are suspended in 180 cc. dimethyl formamide. After the addition of 30 g. anhydrous potassium carbonate, the mixture is stirred at 70° for two hours. Then 8 g. chloroacetic acid ethyl ester are added dropwise, the reaction mixture is stirred at 70° for 7 hours and filtered off with suction while hot, finally the filtrate is evaporated to dryness in the vacuum. The resultant residue is dissolved in ethyl acetate, the solution is washed several times with dilute aqueous sodium hydroxide solution, then dried with sodium sulfate. Subsequently, ethyl acetate solution is admixed with hydrochloric acid in ether, whereby the monobromo-3-β-diethylaminoethyl-4-methyl-7-ethoxy-carbonyl-methoxy-coumarin hydrochloride is precipitated. The compound has a melting point of 177°. The yield is 14 g. (61% of the theoretical).

The monobromo - 3 - β - diethylaminoethyl - 4 - methyl-7-hydroxy-coumarin hydrobromide is obtained as follows:
30 g. 3 - β - diethylaminoethyl - 4 - methyl - 7 - hydroxy-coumarin hydrochloride having a melting point of 276° (with decomposition) are dissolved with heating in 700 cc. glacial acetic acid. The solution is then allowed to cool down to room temperature, admixed dropwise with 16 g. bromine, and stirred at room temperature for another hour. Thereupon, the reaction mixture is heated to the boil and stirred for one hour with heating under reflux. The mixture is allowed to cool down and the product crystallizing out is filtered off with suction, washed several times with methanol, and dried. Thus, 28.6 g. (68% of the theoretical) monobromo-3-β-diethylaminoethyl-4-methyl-7-hydroxy-coumarin hydrobromide are obtained having a melting point of 261° (with decomposition).

Example 2

20 g. 6,8 - dibromo - 3 - β - diethylaminoethyl - 4 - methyl-7-hydroxy-coumarin hydrobromide, prepared as described below, are suspended in 150 cc. dimethyl formamide. After the addition of 7 g. anhydrous potassium carbonate, the mixture is reacted, according to Example 1, with 7 g. chloroacetic acid ethyl ester. The reaction mixture is then filtered off with suction in the heat and the filtrate is evaporated to dryness in the vacuum. The resultant residue is dissolved in methylene chloride, the solution is washed several times with dilute aqueous sodium hydroxide solution, and evaporated to dryness. The resultant raw product is recrystallized from benzine for purification purposes.

Yield: 12 g. (59.5% of the theoretical) 6,8-dibromo-3-β - diethylaminoethyl - 4 - methyl - 7 - ethoxy - carbonyl-methoxy-coumarin (melting point: 112–114°).

The 6,8 - dibromo - 3 - β - diethylaminoethyl - 4 - methyl-7-hydroxy-coumarin hydrobromide is prepared as follows:

30 g. 3 - β - diethylaminoethyl - 4 - methyl - 7 - hydroxy-coumarin hydrochloride are dissolved with heating in 700 cc. glacial acetic acid. The solution is then allowed to cool down to room temperature, admixed with 38 g. bromine, stirred for 2 hours at room temperature, and subsequently, for another 2 hours at boiling temperature. Thereupon the mixture is allowed to cool down, whereby the reaction product crystallizes out. This reaction product is then filtered off with suction and washed with methanol to remove the glacial acetic acid. Thus, 6,8-dibromo-3-β-diethylaminoethyl-4-methyl-7-hydroxy-coumarin hydrobromide are obtained having a melting point of 280° (with decomposition).

Example 3

20.5 g. monochloro-3-β-diethylaminoethyl-4-methyl-7-hydroxy-coumarin hydrochloride, prepared as described below, and 10 g. anhydrous potassium carbonate are suspended in 150 cc. dimethyl formamide and stirred at 70° for 2 hours, admixed dropwise with 10 g. chloroacetic acid ethyl ester, stirred at 70° for 6 hours, and filtered off with suction while hot. The filtrate is evaporated to dryness in the vacuum. The remaining residue is dissolved in ethyl acetate, the solution is washed several times with dilute aqueous sodium hydroxide solution, and the ethyl acetate solution is dried. By introduction of hydrochloric acid gas into this solution, the monochloro-3-β-diethylaminoethyl - 4 - methyl - 7 - ethoxy - carbonyl - methoxy-coumarin hydrochloride is precipitated. Thus, 13 g. (50.5% of the theoretical) of this hydrochloride are obtained having a melting point of 188°.

The monochloro-3-β-diethylaminoethyl-4-methyl-7-hydroxy-coumarin hydrochloride is prepared as follows:

30 g. 3 - β - diethylaminoethyl - 4 - methyl - 7 - hydroxy-coumarin hydrochloride are dissolved in 700 cc. glacial acetic acid and 20 g. sulfuryl chloride are added dropwise at room temperature. The mixture is then stirred at room temperature for half an hour. Thereupon the mixture is allowed to cool down, the precipitated reaction product is filtered off with suction and washed with methanol. Thus, 29.6 g. (89% of the theoretical) monochloro-3-β-diethylaminoethyl-4-methyl-7-hydroxy-coumarin hydrochloride are obtained having a melting point of 278° (with decomposition). The same compound is obtained by treating at room temperature a solution of 3-β-diethylaminoethyl-4-methyl-7-hydroxy-coumarin in glacial acetic acid with gaseous chlorine.

Example 4

14 g. mononitro-3-β-diethylaminoethyl-4-methyl-7-hydroxy-coumarin hydrochloride, prepared as described below, and 12 g. anhydrous potassium carbonate are stirred in 140 cc. dimethyl formamide at 70° for 2 hours. 6 g. chloroacetic acid ethyl ester are added dropwise to this mixture which is then stirred at 70° for 6 hours. Thereupon it is filtered off with suction while hot and the filtrate is evaporated to dryness in the vacuum. The remaining residue is dissolved in ethyl acetate, the solution is washed with dilute aqueous sodium hydroxide solution, the ethyl acetate layer is separated and dried. By introduction of hydrochloric acid gas to this solution the mononitro - 3 - β - diethylaminoethyl - 4 - methyl - 7-ethoxy-carbonyl-methoxy-coumarin hydrochloride is precipitated.

Yield: 10.3 g. (59.4% of the theoretical) of the compound having a melting point of 198°.

The mononitro - 3 - β - diethylaminoethyl - 4 - methyl-7-hydroxy-coumarin hydrochloride is obtained as follows:

30 g. 3-β-diethylaminoethyl-4-methyl-7-hydroxy-coumarin hydrochloride are dissolved in 700 cc. glacial acetic acid. With cooling, 7 g. concentrated nitric acid (density: 1.518) are added dropwise. The mixture is then stirred at room temperature for 1 hour and is finally heated to the boil for a short time. This mixture is allowed to cool down, the precipitated reaction product is filtered off with suction and washed with methanol. Thus, 28.8 g. (84% of the theoretical) mononitro-3-β-diethylaminoethyl-4-methyl-7-hydroxy-coumarin hydrochloride are obtained having a melting point of 244–245°.

The following derivatives of the 7-hydroxy-coumarin are obtained analogously:

Final product:     Melting point of the hydrochloride (1) Monoiodo-3-β-diethylaminoethyl - 4 - methyl-7-ethoxy-carbonyl-methoxy-coumarin ____ 186

(2) Monobromo-3-β-piperidinoethyl - 4 - methyl-7-ethoxy-carbonyl-methoxy-coumarin ____ 215

(3) Monobromo-3-β-morpholinoethyl- 4 -methyl-7-ethoxy-carbonyl-methoxy-coumarin ____ 216

(4) 6,8-dibromo-3-β-morpholinoethyl- 4 -methyl-7-ethoxy-carbonyl-methoxy-coumarin ____ 188

(5) Monochloro-3- β -morpholinoethyl-4-methyl-7-ethoxy-carbonyl-methoxy-coumarin ____ 229

(6) Monobromo - 3 - γ - diethylaminopropyl-4-methyl - 7 - ethoxy-carbonyl-methoxy-coumarin _____ 120

(7) Monobromo-3-β-morpholinoethyl- 4 -methyl-7-α-(ethoxy-carbonyl)-ethoxy-coumarin __ 167

(8) Monobromo - 3 - β - diethylaminoethyl - 4 - phenyl - 7 - ethoxy-carbonyl-methoxy-coumarin _____ 172

(9) Monochloro - 3 - β - diethylaminoethyl - 4 - phenyl - 7 - ethoxy-carbonyl-methoxy-coumarin _____ 198

(10) 6,8-dibromo-3-β-piperidinoethyl - 4 - methyl-7-ethoxy-carbonyl-methoxy-coumarin ____ 199

The pharmacological investigation of the substances according to our present invention with respect to their coronary vaosdilator action was carried out in dogs according to the method disclosed by Eckenhoff, Hafkenschiel and Landmesser (Am. J. Physiol. 148, 582 (1947). The test preparations were applied intravenously to the animals narcotized. The coronary blood flow was measured by means of an automatic Bubble-Flow-Meter. During the test period the animals were given artificial respiration. On these test conditions the dilatation of the coronary artery being caused by the test substance, gives rise to a more rapid bubble flow, whereas a constriction of the coronary vessels becomes evident from a retardation of the bubble flow, which is recorded by a kymograph. In all these tests there were used papaverine, khelline and the 4-methyl-5,7-bis(β-piperidino-ethoxy)-coumarin dihydrochloride known from the Journal of Medical and Pharmaceutical Chemistry 3, 231 to 240, (1961) as comparative standard substances.

The following table comprises the results obtained from the comparative investigations. The coumarin derivatives were tested in the form of their hydrochlorides.

| Substance | LD$_{50}$ g./kg. Mouse i.p. | Dosage, mg./kg. i.v. | Maximal percentage increase in the coronary flow | Duration of action in minutes |
|---|---|---|---|---|
| Monobromo-3-β-diethyl-aminoethyl-4-methyl-7-ethoxy-carbonyl-methoxy-coumarin | 0.65 | 2.0 | 37 | 30 |
| 6,8-dibromo-3-β-diethyl-aminoethyl-4-methyl-7-ethoxy-carbonyl-methoxy coumarin | 0.27 | 2.0 | 20 | 20 |
| Monochloro-3-β-diethyl-aminoethyl-4-methyl-7-ethoxy-carbonyl-Mmethoxy-coumarin | 0.7 | 2.0 | 38 | 40 |
| ononitro-3-β-diethyl-aminoethyl-4-methyl-7-ethoxy-carbonyl-Mmethoxy-coumarin | 0.49 | 2.0 | 21 | 60 |
| onoiodo-3-β-diethyl-aminoethyl-4-methyl-7-ethoxy-carbonyl-Mmethoxy-coumarin | 0.5 | 2.0 | 28 | 30 |
| onobromo-3-β-piperidino-ethyl-4-methyl-7-ethoxy-carbonyl-methoxy-coumarin | 0.55 | 2.0 | 14 | 20 |
| Monobromo-3-β-morpholino-ethyl-4-methyl-7-ethoxy-carbonyl-methoxy-coumarin | 0.65 | 2.0 | 44 | 50 |
| 6,8-dibromo-3-β-morpholino-ethyl-4-methyl-7-ethoxy-carbonyl-methoxy-coumarin | 0.9 | 2.0 | 37 | 16 |
| Monochloro-3-morpholino-ethyl-4-methyl-7-ethoxy-carbonyl-methoxy-coumarin | >0.8 | 1.0 | 33 | >90 |
| Monobromo-3-γ-diethyl-aminopropyl-4-methyl-7-ethoxy-carbonyl-methoxy-coumarin | 0.55 | 0.5 | 32 | 40 |
| Monobromo-3-β-morpholino-ethyl-4-methyl7-(-α-ethoxy-carbonyl)-ethoxy-coumarin | 0.5 | 2.0 | 32 | 8 |
| Monobromo-3-β-diethyl-aminoethyl-4-phenyl-7-ethoxy-carbonyl-methoxy-coumarin | 0.36 | 1.0 | 21 | 35 |
| Monochloro-3-β-diethyl-aminoethyl-4-phenyl-7-ethoxy-carbonyl-methoxy-coumarin | 0.34 | 1.0 | 82 | 40 |
| Papaverine | 0.24 | 0.8 | 23 | 10 |
| Khelline | 0.155 | 2.0 | 16 | 16 |
| 4-methyl-5,7-bis-(β-piperidino-ethoxy)-coumarin dihydrochloride | 0.5 | 2.0 | 0 | 0 |

The values as found demonstrate that the products under the present invention show either a considerably greater dilatory effect on the coronary vessels and/or a much longer duration of action as compared with the known compounds.

In the preparation of drageese and tablets containing as active ingredient the 7-hydroxy-coumarin derivatives of our invention, these substances may be admixed with solid tabletting adjuvants, such as starch, lactose, talc and the like. Any of the tabletting materials used in pharmaceutical practice may be employed. For the preparation of the injection solutions there are particularly suited the hydrochlorides of the claimed 7-hydroxy-coumarin derivatives since they are water-soluble. Injection solutions of water-soluble products may of course be prepared in the conventional manner by concurrently using well-known suspending agents, emulsifiers and/or solubilizers.

What we claim is:

1. A compound having the structural formula

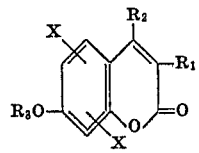

wherein X is selected from the group consisting of chlorine, bromine, iodine and mononitro or one of the X is selected from the group consisting of chlorine, bromine, iodine and mononitro and the other X is a hydrogen atom, $R_1$ is selected from the group consisting of piperidino ethyl, morpholino ethyl, pyrrolidino ethyl, diethylamino ethyl and diethylamino propyl, $R_2$ is selected from the group consisting of methyl and phenyl, and $R_3$ is selected from the group consisting of ethoxy-carbonyl-methyl and ethoxy-carbonyl-ethyl.

2. Monochloro - 3 - β -diethylaminoethyl-4-methyl - 7- ethoxy-carbonyl-methoxy-coumarin or and the hydrochloride thereof.

3. Monobromo - 3 - β -morpholino-ethyl-4-methyl-7- ethoxy-carbonyl-methoxy-coumarin or the hydrochloride thereof.

4. Monobromo - 3 - β -diethylamino-4-phenyl-7-ethoxy-carbonyl-methoxy-coumarin or the hydrochloride thereof.

References Cited

UNITED STATES PATENTS 3,282,938   11/1966   Ritter et al. _____ 260—247.2

ALEX MAZEL, Primary Examiner

J. TOVAR, Assistant Examiner

U.S. Cl. X.R.

260—294.3, 326.3, 343.2; 424—248, 207, 274